United States Patent [19]

Klaren

[11] Patent Number: 4,984,624
[45] Date of Patent: Jan. 15, 1991

[54] METHOD FOR THE START-UP AND SHUT-DOWN OF AN INSTALLATION FOR OPERATING PHYSICAL AND/OR CHEMICAL PROCESSES, AND A SYSTEM FOR THIS PURPOSE

[75] Inventor: Dick G. Klaren, Hillegom, Netherlands

[73] Assignee: Eskla B.V., Schiedam, Netherlands

[21] Appl. No.: 421,177

[22] Filed: Oct. 13, 1989

[30] Foreign Application Priority Data

Oct. 18, 1988 [NL] Netherlands ............... 8802570

[51] Int. Cl.$^5$ .................................. F28D 3/12
[52] U.S. Cl. ...................... 165/104.16; 141/1; 422/145; 422/146
[58] Field of Search .............. 165/104.16, 104.18; 422/145, 146; 122/4 D; 141/1

[56] References Cited

U.S. PATENT DOCUMENTS

| 4,022,255 | 5/1977 | Pegels et al. | 141/1 |
| 4,119,139 | 10/1978 | Klaren | 165/104.16 |
| 4,220,193 | 9/1980 | Klaren | 165/104.16 |

FOREIGN PATENT DOCUMENTS

7413636  4/1976 Netherlands .

Primary Examiner—Albert W. Davis, Jr.
Attorney, Agent, or Firm—Webb, Burden, Ziesenheim & Webb

[57] ABSTRACT

Installations for operating physical and/or chemical processes, for example heat exchangers, comprising a bundle of parallel vertical tubes which, via tube plates, are in open connection with a bottom header and a top header, are known to operate with a granular mass maintained in a steady or quasi-steady fluidized state, at least in the tubes, by means of a medium flowing upwards through the headers and tubes. At start-up and shut-down of such installations problems are encountered because the granular mass tends to settle to form a packed bed, in particular if the upwardly flowing medium may contain solid impurities or has a rather high viscosity. The invention solves such problems by using a storage vessel, to which the granular mass is flushed at shut-down of the installation, a partial stream of the flowing medium being first fed through the tubes at start-up, after which the granular mass is flushed from the storage vessel to the tubes and only thereafter the main stream of medium is fed to the tubes. At shut-down said main stream is first reduced and then the granular mass is flushed back to the storage vessel and thereafter the partial stream of the medium is shut off.

15 Claims, 2 Drawing Sheets

METHOD FOR THE START-UP AND SHUT-DOWN OF AN INSTALLATION FOR OPERATING PHYSICAL AND/OR CHEMICAL PROCESSES, AND A SYSTEM FOR THIS PURPOSE

The invention first of all relates to a method for the start-up and shut-down respectively of an installation for operating physical and/or chemical processes, for example a heat exchanger, which installation comprises a bundle of parallel vertical tubes which, via tube plates, are in open connection with a bottom header and a top header, in which a granular mass can be maintained in a steady or quasi-steady fluidised state, at least in the tubes, by means of a medium flowing upwards through the headers and the tubes during operation.

Furthermore, the invention relates to a system for the operation, start-up and shut-down of an installation, in particular a heat exchanger, as described above, and to be used with the abovementioned method.

An installation of the type described, comprising a bundle of parallel vertical tubes, a bottom header and a top header and also a granular mass which is kept in a steady and/or quasi-steady fluidised state during operation by means of a medium flowing upwards, is described, inter alia, in the earlier American Patent No. 4,220,193 and in the earlier European Patent No. 0,132,873. In this context and in the earlier cited patents, a quasi-steady fluidised granular mass is understood to mean a state in which some circulation of the granular mass is possible, such that grains can move downwards through, for example, a wider tube, a so-called fall tube, and move upwards through the other tubes, but in which the grains and medium in the tubes in which the granular mass is moving upwards, the so-called riser tubes, are distributed in the manner corresponding to that of a steady fluidised granular bed.

If the known installation is started up from stationary, the granular mass is in the unfluidised state, that is to say in the form of a packed bed, at least in the bottom header. By now allowing a medium to flow through the bottom header, through the tubes and to the top header at an appropriate flow rate, the granular mass will first start to fluidise in the tubes and possibly subsequently also in the bottom header, after which an operating state is obtained.

With this method a problem can arise if a flowing medium is used which is loaded with solid impurities, such as with fibres, small pieces of skin or small crystals, such as can arise, for example, in the potato flour industry and in many other operations. If a medium of this type is fed to the bottom header there is a high chance that the initially tightly packed granular mass will act as a filter for the solid impurities in the flowing medium, as a result of which parts of the initially tightly packed granular mass become blocked. The consequence of this can then be that the correct distribution of the granular mass and the flowing medium over the tubes is not achieved and that, as a result, the desired operating state is not set up. Similar problems can arise if the flowing medium has a raised viscosity or possesses structurally viscous characteristics. Under critical conditions, a non-uniform operating state can then also arise during start-up. The object of the inven-tion is, first of all, to provide a method with which the known installation can regularly be started up, or shut down again, in such a way that the start-up can take place again in an analogous manner in the following cycle, even when a medium is used which is loaded with solid impurities or possesses a raised viscosity. The invention thus consists in that, in the method given as known, first of all a partial stream of the medium is fed via the bottom header, the tubes and the top header while there is still no granular mass present herein and that subsequently granular mass is flushed from a storage vessel into the installation, preferably into the top header, until said mass has been transferred from the storage vessel, after which the main stream of the medium is fed through the bottom header, tubes and top header; or, for shut-down respectively, that first the main stream of the medium is reduced to a partial stream, after which the granular mass is flushed back from the bottom header to the storage vessel, after which the remaining partial stream of the medium is shut off. Since only a partial stream of the medium is still passed through the tubes during the flushing over of the grains to the top header, the grains from the top header will move downwards in divided form through the tubes into the bottom header. During this operation, the partial stream causes the granular mass to distribute uniformly over the tubes and prevents the formation of a tight packing of the granular mass. Thus, no blockage of the granular mass can occur as a consequence of the solid impurities from the medium supplied, and the operation of the installation can take place unimpeded.

It is pointed out that it is also conceivable to flush in the granular mass to the bottom header. However, for a good uniform grain distribution in the instal-lation it is preferable to flush the granular mass to the top header.

In those cases where several installations of the type given as known are set up, it is possible to start up and shut down each of these installations separately in the manner described. However, it is preferable to carry out the start-up and shut-down as common operations for all installations, using a single common storage vessel for granular mass.

A possible variant of the method for flushing in the granular mass to the installation consists in using a stream of a second medium which is independent of the first medium, this second medium being transported with pump pre-pressure. A fluid which corresponds to the first medium but which is free from solid impurities can then, for example, be used as the second medium, although this is not strictly necessary. By regulating the pump pre-pressure and the flow rate of the second medium, the speed at which the granular mass is flushed in can be completely controlled. Although this method thus offers advantages, it can present drawbacks if use of a stream of a second medium is undesired. In this case a method is to be preferred in which the flushing in of the granu-lar mass from the storage vessel is effected using the remainder of the main stream of the first medium, which thus is not passed via the bottom header to the tubes. In order to control the speed at which the granular mass is flushed in, special measures are then demanded for this purpose, which will be explained in more detail below.

Apart from relating to the method described, the invention also relates to a system for the operation, start-up and shut-down of an installation, in particular a heat exchanger, of the type comprising a bundle of parallel, vertical tubes which are in open connection with a bottom header and a top header, and with which a granular mass is present which during operation is kept in a steady and/or quasi-steady fluidised state, at least in the tubes, by means of a medium flowing upwards through the bottom header, the tubes and the top header, and which system is suitable for carrying out the method described above. This system is characterized in that, in addition to the said installation, a storage vessel is also provided which is connected by means of a fill line and a return flow line to the installation, preferably to the top header and to the bottom header respectively, shut-off valves being located in the fill line and in the return flow line, while furthermore in/at the storage vessel a flush-in line opens and an overflow line is connected thereto. With this system it is possible to flush granular mass present in the storage vessel via the fill line to the top header and, when shutting down the installation, to feed it via the return flow line back to the storage vessel. It will be clear that during transport to the top header the shut-off valve in the fill line must be opened and the shut-off valve in the return flow line must be closed, while when returning the granular mass to the storage vessel the shut-off valve in the fill line must be closed and the shut-off valve in the return flow line must be opened. The flush-in line is provided in order to carry a stream of the medium into the storage vessel in such a way that, as a result, granular mass is entrained and carried with this medium to and through the fill line. The stream of the medium which joins the flow of the granular mass from the bottom header when returning the granular mass can be removed from the storage vessel via the overflow line.

As has already been mentioned, the flushing in of the granular mass can be effected with a second medium. For this purpose the system must then be provided with a pump which is connected to a liquid source. According to another solution, the granular mass is flushed in using a partial stream of the first medium, for which purpose the flush-in line is then connected to a feed line for feeding the first medium to the bottom header.

The flow rate of the first medium through the flush-in line must be chosen such that the granular mass in the storage vessel is brought into movement in an optimum manner and transported to the inlet of the fill line. As a rule, however, the flow rate of the first medium from the flush-in line will then be insufficient to ensure a rapid transport of the grains through the fill line. This transport can be appreciably accelerated if a further partial stream of the medium fed to the bottom header is branched off and opens, via a bypass line, into the fill line close to the inlet opening thereof. By means of a shut-off valve in the bypass line, the desired flow rate of the medium through the fill line can then be adjusted.

A further improvement of the system is also obtained if the fill line is extended by a dip tube which extending to the bottom region of the storage vessel, the flush-in line opening at an acute angle in front of the inflow orifice of the dip tube and the dip tube furthermore being provided with a jacket which encloses a space, the top of which is connected to the bypass line and the bottom of which is connected to the interior of the dip tube.

The invention will now be explained with the aid of two figures.

Figure 1:
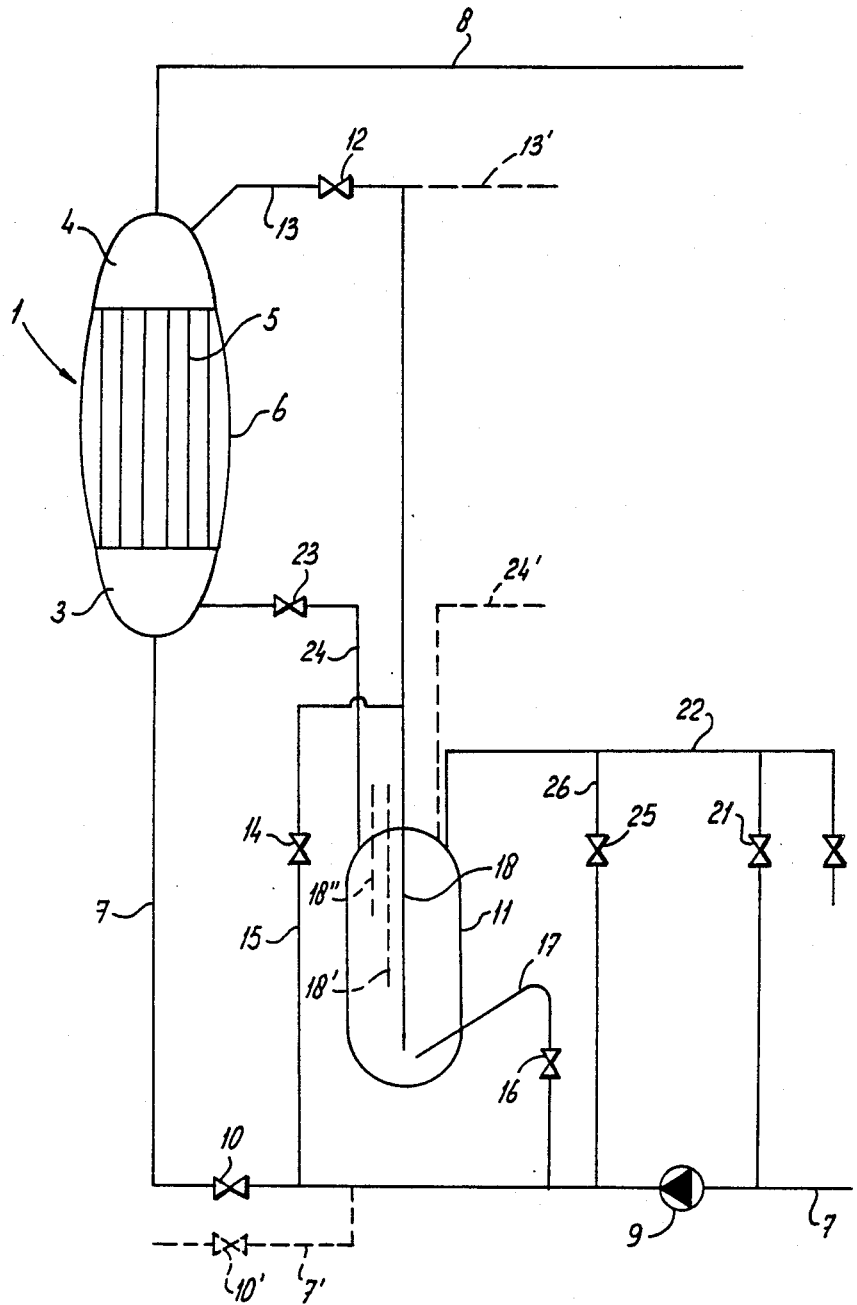
FIG. 1 shows a schematic arrangement of the system according to the invention.

In FIG. 1 reference number 1 indicates an installation for the operation of physical and/or chemical processes. As a rule, this installation will be used as a heat exchanger. Hereafter it will thus be indicated as either "installation" or "heat exchanger". The installation comprises a system of vertical tubes 5 which are coupled by means of tube plates to a bottom header 3 and a top header 4. The bundle of tubes 5 is surrounded by a jacket 6. A flow medium can be supplied from a feed line 7 to the bottom header 3, after which it can flow away via the tubes 5 and the top header 4 via discharge line 8. When installation 1 is used as a heat exchanger, another flowing medium can be conveyed the bottom header 3, after which it can flow away via the tubes 5 and the top header 4 via discharge line 8. When installation 1 is used as a heat exchanger, another flowing medium can be conveyed inside the jacket 6 along the outer surface of tubes 5 (not shown). A pump 9 and a shut-off valve 10 are also fitted in feed line 7. If the flowing medium is a gas, the pump 9 will be replaced by a fan. In this explanation, however, it is assumed that the flowing medium is a liquid and speci-fically a liquid which is loaded with solid impurities.

Figure 2:
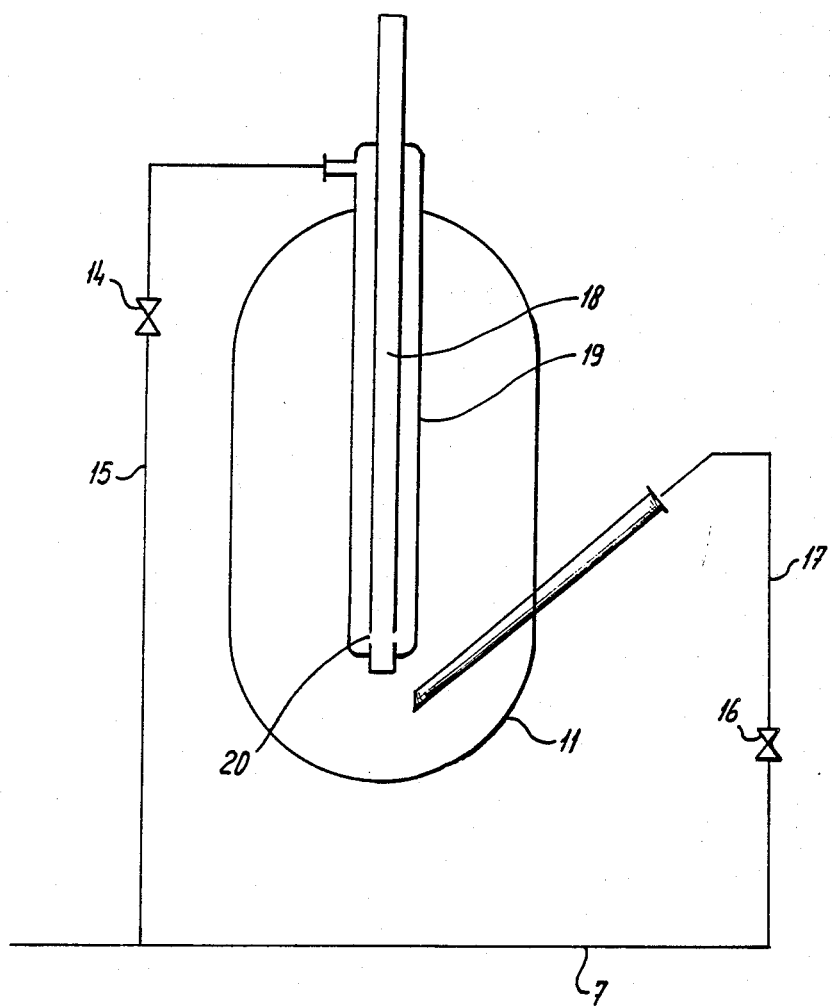
FIG. 2 shows the storage vessel on an enlarged scale.

A storage vessel 11 is provided which is dimensioned such that the total amount of granular mass required during operation in the installation 1 can be stored herein leaving free a sufficiently large open space to enable this granular mass to be flushed up. Storage vessel 11 is connected by means of fill line 13 to top header 4, a shut-off valve 12 being located in this fill line 13. The fill line 13 is extended as a dip tube 18 inside storage vessel 11 to close to the bottom of the vessel 11. Return flow line 24 is connected close to the top of the storage vessel 11 and connects the storage vessel to the bottom header 3. A shut-off valve 23 is provided in the return flow line 24. With shut-off valve 12 opened, granular mass can be fed via the fill line 13 from the storage vessel 11 to the top header 4, while when shut-off valve 23 is opened granular mass can be transported from the bottom header 3 through the return flow line 24 back to the storage vessel 11. A bypass line 15 provided with shut-off valve 14 connects feed line 7, between pump 9 and shut-off valve 10, with fill line 13. A partial stream of the flowing medium originating from feed line 7 can be branched off via this bypass line 15 in order to increase the flow rate through fill line 13. By this means it is then possible to accelerate the transport of granular mass through the fill line 13. The flushing in of granular mass from storage vessel 11 to inside fill line 13 is effected with the aid of the flush-in line 17, which likewise branches off from the feed line 7. Flush-in line 17 is also provided with a shut-off valve, which is indicated by reference number 16. Flush-in line 17 is arranged at an acute angle relative to dip line 18 and opens in storage vessel 11 close to the inflow orifice of the dip tube 18. The flowing FIG. 2 shows the storage vessel 11 with flush-in line 17 and bypass line 15 on an enlarged scale in more detail. In this figure a jacket 19 is shown which is fitted around the dip tube and is provided with openings close to the top and bottom. Close to the top of the jacket, the space between jacket and dip tube is connected to bypass line 15, while the bottom of the space between jacket 19 and dip tube 18 is connected by means of openings 20 in the dip tube to the interior of the dip tube. By this means it is possible for flowing medium originating from bypass line 15 to emerge into the dip tube at a much lower position than in FIG. 1 and to do so in the direct vicinity of the inflow orifice of the dip tube. As a result the flow rate through dip tube 18 and fill line 13 can be increased. In particular in the case of long dip tubes and a tightly packed granular mass, this embodiment gives a much better effect as a result of a better pressure distribution and a lower pressure drop in the entire system is possible.

An overflow line 22 is further connected at the top of storage vessel 11, said overflow line in turn being connected to the feed line 7 upstream of pump 9. Overflow line 22 is also provided with a shut-off valve 21. In addition, an adjustment line 26, which is connected to feed line 7 downstream of pump 9, branches off from overflow line 22. A shut-off valve 25 is also located in this adjustment line 26.

If granular mass from the bottom header 3 is flushed back via return flow line 24 to the storage vessel, the granular mass must settle in the storage vessel 11. However, the transporting flowing medium must be removed from the storage vessel 11 and overflow line 22 serves for this purpose, it being possible to influence the flow pattern through overflow line 22 with the aid of shut-off valves 21 and 25.

Prior to the start-up of installation 1 there is no granular mass in the installation. The total amount of a granular mass is still in storage vessel 11. All lines which connect to vessel 11 are then still closed by means of various shut-off valves incorporated therein. A volume stream of the medium through the installation 1 is then adjusted with the aid of shut-off valve 10 such that it would not be possible for a packed bed of granular mass to form in bottom header 3 if the granular mass then still present in storage vessel 11 were present in installation 1. If thereafter the granular mass is present in installation 1, it remains sufficiently permeable to the solid impurities in the flowing medium and no blockage can arise. Shut-off valves 12, 14 and 16 are then opened successively. The medium which passes via flush-in line 17 into the storage vessel 11 will then swirl up the granular mass and carry it along to inside, successively, dip tube 18, fill line 13 and top header 4. Dip tube 18 extends into the granular mass with which vessel 11 is approximately half filled. The stream of medium which flows via bypass line 15, jacket 19, openings 20 and dip tube 18 will increase the speed of the granular mass in line 13.

It is pointed out that it is of essential importance that the resistance through installation 1 including the regulating shut-off valve 10 always remains greater than the fluid resistance via the fill path, i.e. in flush line 17, the tube 18 and fill line 13, since otherwise the filling process comes to a halt. This can on the one hand be provided by the adjustment of shut-off valve 10, while it can furthermore be achieved by feeding sufficient flowing medium via line 15 so that a substantial dilution of the granular mass in fill line 13 is achieved. Furthermore, care must be taken that the point at which the dilution takes place is located as close as possible to the actual inlet orifice of dip tube 18, for which purpose the construction according to FIG. 2 is to be greatly preferred.

As the amount of granular mass present within installation 1 increases, the fluid resistance through installation 1 also increases. In order to prevent a solid packing arising, the shut-off valve 10 must be continually opened somewhat further to keep the total fluid resistance between pump 9 via installation 1 and discharge line 8 more or less constant.

Once all of the granular mass has been transferred from storage vessel 11 to installation 1, the storage vessel must be shut off from installation 1 by closing the shut-off valves 16, 14 and 12 successively.

It is self-evident that for filling the installation with granular mass it is also possible additionally to provide line 17 with a pump (not shown) or to connect line 17 by means of such a pump to a source of a second medium. It is then possible, using the pump prepressure which can be achieved by this means in line 17, to guarantee grain transport to the top header, possibly even without using bypass line 15, even in the case of a high resistance in the fill path.

If the operation with installation 1 is terminated again, it is important to return the granular mass to storage vessel 11 in order to be able to start from the same initial condition for a subsequent start-up.

The return of the granular mass is then effected as follows: first of all all shut-off valves in the lines which are connected to storage vessel 11 are closed. Shut-off valve 10 is closed down su much that the amount of medium which continues to flow through installation 1 is at least the minimum required to ensure that a dense packing of granular mass in bottom header 3 does not occur. Shut-off valves 21 and 23 are then opened successively. As a consequence of the pressure difference which exists between bottom header 3 and the suction side of pump 9, flowing medium with granules will flow through line 24 to storage vessel 11, where the granular mass will settle. The medium then continues to flow through the overflow line 22 to the suction side of pump 9. The quantity of this medium can be adjusted with the aid of shut-off valve 21 and by this means the speed of removal of the granular mass from installation 1 is thus also required. Granular mass returned to the storage vessel 11 can be prevented from being carried over to overflow line 22 by the dimensioning of storage vessel 11 and by the adjustment of the stream of medium through overflow line 22. If necessary, return flow line 24 can additionally be connected tangentially to the cylindrical periphery of storage vessel 11 for this purpose. Once the granular mass has been removed from bottom header 3, it can be advisable to flush through the line 24 back in the reverse direction again in order to prevent the closing of shut-off valve 23 being hindered by granules present therein. This can be achieved by first of all closing shut-off valve 21 and then opening shut-off valve 25 in the adjustment line 26. By this means a stream of medium will then start to flow under pump pressure via adjustment line 26, overflow line 22, the top of storage vessel 11 free from granular mass and the return flow line 24. Finally, the entire installation is closed down by then closing shut-off valves 23, 25 and 10 and switching off the power to pump 9.

When a single storage vessel 11 is used for more than one installation to be started up, as stated, the filling of each of these installations can be controlled by means of suitable measuring equipment. A single dip tube 18 can then also be used, in which case the fill line 13 branches to lead to said installations. It is also possible to use parallel dip tubes in one and the same storage vessel, which dip tubes, each under the influence of measuring and control equipment with shut-off valves etc. operated by these means, each feed only an appropriate portion of the granular mass from the storage vessel 11 when filling an installation connected thereto. Said dip tubes 18 then preferably open out at different heights in the storage vessel 11, so that each dip tube empties the storage vessel approximately over a height corresponding to the difference in height between the open ends of two dip tubes, these operations furthermore being under the control of suitable measuring equipment to fill all installations to the desired extent. In FIG. 1 13' indicates how the fill line 13 can branch in this way, in which case each installation 1 then can have its own feed line 7, while, as described, a second medium provides for the flushing in from storage vessel 11, or the line 7 can also be branched to feed to more than one installation of the type indicated, as is shown with 7' in FIG. 1. Each installation 1 has, of course, its own return flow line 24 feeding into the storage vessel 11 (see 24' in FIG. 1).

The use of a separate fill line with dip tube for each installation, which dip tubes open at different heights in the common storage vessel 11, instead of the single branched fill line 13 is indicated schematically in FIG. 1 by the broken lines 18' and 18" for supplementary dip tubes. The storage vessel 11 can then have a shape which is adapted to the presence of several dip tubes, which, for example, can be fitted in a row in a storage vessel which has an elongated horizontal section for this purpose, or also in a central ring in a circular storage vessel.

What is claimed:

1. Method for the start-up and shut-down respectively of an installation for operating physical and/or chemical processes, for example a heat exchanger, which installation comprises a bundle of parallel vertical tubes which, via tube plates, are in open connection with a bottom header and a top header, in which a granular mass can be maintained in a steady or quasi-steady fluidised state, at least in the tubes, by means of a medium flowing upwards through the headers and the tubes during operation, characterized in that first of all a partial stream of the medium is fed via the bottom header, the tubes and the top header while there is still no granular mass present herein and that subsequently granular mass is flushed from a storage vessel into the installation, until said mass has been transferred from the storage vessel, after which the main stream of the medium is fed through the bottom header, tubes and top header; or, for shut-down respectively, that first the main stream of the medium is reduced to a partial stream, after which the granular mass is flushed back from the bottom header to the storage vessel, after which the remaining partial stream of the medium is shut off.

2. Method according to claim 1, in which during start-up the granular mass is flushed from the storage vessel into the top header.

3. Method according to claim 1, in which several installations are started up or shut down respectively using a single storage vessel.

4. Method according to claim 1, in which the flushing in of the granular mass to the installation is effected with the aid of a stream of a second medium which is independent of the first medium and which second medium is transported using pump pre-pressure.

5. Method according to claim 1, in which the flushing in of the granular mass from the storage vessel is effected using the remainder of the main stream of the first medium.

6. System for the operation, start-up and shut-down of an installation, in particular a heat exchanger, of the type comprising a bundle of parallel, vertical tubes which are in open connection with a bottom header and a top header, and in which a granular mass is present which during operation is kept in a steady and/or quasi-steady fluidised state, at least in the tubes, by means of a medium flowing upwards through the bottom header, the tubes and the top header, the system also comprises a storage vessel, which is connected by means of a fill line and a return flow line to the installation to the top header and to the bottom header respectively, shut-off valves being located in the fill line and in the return flow line, while furthermore in/at the storage vessel a flush-in line opens and an overflow line is connected thereto.

7. System according to claim 6, in which the flush-in line is connected via a pump to a fluid source.

8. System according to claim 6, in which the flush-in line is connected to a feed line for feeding said medium to the bottom header.

9. System according to claim 6, in which a line provided with a shut-off valve opens into the fill line close to the inlet opening thereof.

10. System according to claim 9, in which said line opening into the fill line is a bypass line, branch from said feed line for feeding the said medium to the bottom header of the installation.

11. System according to one of claim 10, in which the fill line is extended as a dip tube which extends into the bottom region of the storage vessel.

12. System according to claim 11, in which the flush-in line opens at an acute angle in front of the inflow orifice of the dip tube.

13. System according to claim 11, in which the dip tube is provided with a jacket which encloses a space, the top of which is connected to said line opening into the fill line close to the inlet opening thereof and the bottom of which is connected to the interior of the dip tube.

14. System according to any of claim 6, for the start-up and shut-down of more than one installation of the state type, in which the fill line branches from a single storage vessel to each of these installations.

15. System according to any of claim 6, for the start-up and shut-down of more than one installation of the stated type, in which more than one fill line opens with a dip tube into a single storage vessel, the bottoms of the dip tubes opening into the storage vessel at different heights.

* * * * *

UNITED STATES PATENT AND TRADEMARK OFFICE
CERTIFICATE OF CORRECTION

PATENT NO. : 4,984,624
DATED : January 15, 1991
INVENTOR(S) : Dick G. Klaren

It is certified that error appears in the above-identified patent and that said Letters Patent is hereby corrected as shown below:

Column 1 Line 64 "inven-tion" should read --invention--.

Column 2 Line 30 "instal-lation" should read --installation--.

Column 2 Line 53 "granu-lar" should read --granular--.

Column 4 Line 17 "speci-fically" should read --specifically--.

Column 4 Line 51 delete "The flowing".

Column 6 Line 17 "su" should read --so--.

Column 6 Line 31 "required" should read --regulated--.

Claim 10 Line 32 Column 8 "branch" should read --branching--.

Claim 14 Line 49 Column 8 "state" should read --stated--.

Signed and Sealed this

Ninth Day of June, 1992

Attest:

DOUGLAS B. COMER

*Attesting Officer*   *Acting Commissioner of Patents and Trademarks*